US012256395B2

(12) United States Patent
Ma et al.

(10) Patent No.: US 12,256,395 B2
(45) Date of Patent: *Mar. 18, 2025

(54) INFORMATION TRANSMISSION METHOD AND APPARATUS

(71) Applicant: Huawei Technologies Co., Ltd., Shenzhen (CN)

(72) Inventors: Ruixiang Ma, Beijing (CN); Yongxia Lyu, Shanghai (CN); Jiafeng Shao, Beijing (CN); Shengyu Li, Beijing (CN); Dan Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

This patent is subject to a terminal disclaimer.

(21) Appl. No.: 17/119,059

(22) Filed: Dec. 11, 2020

(65) Prior Publication Data

US 2021/0168771 A1 Jun. 3, 2021

Related U.S. Application Data

(63) Continuation of application No. 16/716,081, filed on Dec. 16, 2019, now Pat. No. 10,880,880, which is a (Continued)

(30) Foreign Application Priority Data

Sep. 30, 2017 (CN) .......................... 201710922917.0

(51) Int. Cl.
*H04W 4/00* (2018.01)
*H04L 1/00* (2006.01)
(Continued)

(52) U.S. Cl.
CPC ........... *H04W 72/23* (2023.01); *H04L 1/0061* (2013.01); *H04W 72/0446* (2013.01); *H04W 76/11* (2018.02); *H04W 76/27* (2018.02)

(58) Field of Classification Search
CPC .......... H04W 72/042; H04W 72/0446; H04W 76/11; H04W 76/27; H04W 72/1289;
(Continued)

(56) References Cited

U.S. PATENT DOCUMENTS 8,718,002 B2 5/2014 Kim et al.
9,253,770 B2 2/2016 Yang et al.
(Continued)

FOREIGN PATENT DOCUMENTS

CN 103997788 A 8/2014
CN 104521306 A 4/2015
(Continued)

OTHER PUBLICATIONS

Samsung, "DCI Contents and Formats", 3GPP TSG RAN WG1 Meeting NR#3, R1-1715982, Sep. 21, 2017, 5 pages, Nagoya, Japan.
(Continued)

*Primary Examiner* — Stephen M D Agosta
(74) *Attorney, Agent, or Firm* — Slater Matsil, LLP

(57) ABSTRACT

This application provides an information transmission method and apparatus. A terminal receives downlink control information (DCI), wherein a format of the DCI corresponds to a time domain resource set, the time domain resource set comprises first time domain resource. The terminal determines the first time domain resource from the time domain resource set based on the format of the DCI and second information, wherein the second information is carried in the DCI, and the second information indicates the index of the first time domain resource in the time domain resource set. And the terminal performs information transmission on the first time domain resource and through a physical channel.

11 Claims, 5 Drawing Sheets

Related U.S. Application Data continuation of application No. PCT/CN2018/108288, filed on Sep. 28, 2018.

(51) Int. Cl.
*H04W 72/0446* (2023.01)
*H04W 72/23* (2023.01)
*H04W 76/11* (2018.01)
*H04W 76/27* (2018.01)

(58) Field of Classification Search
CPC ......... H04W 72/0493; H04W 72/0406; H04W 72/04; H04L 1/0061; H04L 1/00; H04L 5/0044; H04L 5/0053; H04L 5/0094; H04L 5/0007; G06F 3/0311; G06F 3/013; G06F 3/04815; G06K 9/00671; G06K 9/00335; G06K 9/00791; H04B 7/0486; H04B 7/0626; H04B 7/0639
See application file for complete search history.

(56) References Cited

U.S. PATENT DOCUMENTS

| | | | |
|---|---|---|---|
| 9,258,741 B2* | 2/2016 | Wang | H04L 1/1614 |
| 9,425,933 B2* | 8/2016 | Aiba | H04W 72/042 |
| 9,456,455 B2 | 9/2016 | Lee et al. | |
| 9,585,136 B2 | 2/2017 | Nam et al. | |
| 9,794,035 B2 | 10/2017 | Han et al. | |
| 10,009,883 B1* | 6/2018 | Naim | H04L 5/0053 |
| 10,880,880 B2* | 12/2020 | Ma | H04W 76/27 |
| 11,239,971 B2* | 2/2022 | Chen | H04B 7/2656 |
| 2010/0111107 A1* | 5/2010 | Han | H04L 5/0091 370/472 |
| 2011/0045837 A1 | 2/2011 | Kim et al. | |
| 2012/0127938 A1 | 5/2012 | Lv et al. | |
| 2012/0176884 A1* | 7/2012 | Zhang | H04B 7/024 370/329 |
| 2013/0136084 A1* | 5/2013 | Zhang | H04L 5/0098 370/329 |
| 2013/0201964 A1 | 8/2013 | Kim et al. | |
| 2013/0208685 A1* | 8/2013 | Zhang | H04L 1/1861 370/329 |
| 2013/0322343 A1 | 12/2013 | Seo et al. | |
| 2014/0064109 A1* | 3/2014 | Krishnamurthy | H04B 7/0456 370/252 |
| 2014/0080503 A1* | 3/2014 | Issakov | G01S 5/10 455/456.1 |
| 2014/0105157 A1 | 4/2014 | Yang et al. | |
| 2014/0105164 A1* | 4/2014 | Moulsley | H04W 4/70 370/329 |
| 2014/0105191 A1* | 4/2014 | Yang | H04L 5/0082 370/336 |
| 2014/0112168 A1* | 4/2014 | Chen | H04L 25/0204 370/252 |
| 2014/0146799 A1 | 5/2014 | Park et al. | |
| 2014/0293843 A1* | 10/2014 | Papasakellariou | H04W 52/325 370/280 |
| 2014/0334412 A1* | 11/2014 | Suzuki | H04W 72/042 370/329 |
| 2015/0016368 A1* | 1/2015 | Dai | H04W 72/23 370/329 |
| 2015/0029958 A1* | 1/2015 | Park | H04L 5/0094 370/329 |
| 2015/0126206 A1* | 5/2015 | Krishnamurthy | H04W 56/001 455/452.1 |
| 2015/0131565 A1* | 5/2015 | Nakashima | H04W 72/21 370/329 |
| 2015/0146588 A1 | 5/2015 | Park | |
| 2015/0189574 A1* | 7/2015 | Ng | H04W 24/08 370/254 |
| 2015/0208387 A1 | 7/2015 | Awad et al. | |
| 2015/0236828 A1 | 8/2015 | Park et al. | |
| 2015/0341865 A1* | 11/2015 | Yang | H04L 1/1861 455/522 |
| 2016/0066284 A1* | 3/2016 | Kwon | H04W 72/0453 370/329 |
| 2016/0066343 A1* | 3/2016 | Lin | H04W 72/1205 370/336 |
| 2016/0073381 A1* | 3/2016 | Ratasuk | H04W 72/23 370/329 |
| 2016/0088594 A1* | 3/2016 | Xiong | H04W 72/121 370/329 |
| 2016/0088660 A1* | 3/2016 | Liu | H04L 5/0005 370/252 |
| 2016/0142898 A1* | 5/2016 | Poitau | H04W 72/0413 370/329 |
| 2016/0149672 A1 | 5/2016 | Shimezawa et al. | |
| 2016/0353415 A1* | 12/2016 | Sarkar | H04W 72/085 |
| 2016/0373287 A1* | 12/2016 | Davydov | H04L 27/3494 |
| 2017/0019882 A1* | 1/2017 | Nimbalker | H04W 72/23 |
| 2017/0019883 A1* | 1/2017 | Nimbalker | H04W 72/23 |
| 2017/0019894 A1* | 1/2017 | Nimbalker | H04L 5/0053 |
| 2017/0078830 A1 | 3/2017 | Wu et al. | |
| 2017/0163396 A1* | 6/2017 | Blankenship | H04W 72/048 |
| 2017/0223687 A1 | 8/2017 | Kuchibhotla et al. | |
| 2017/0310431 A1* | 10/2017 | Iyer | H04L 1/1819 |
| 2017/0332288 A1* | 11/2017 | Sadek | H04L 5/001 |
| 2017/0338911 A1* | 11/2017 | You | H04L 1/1861 |
| 2018/0176945 A1 | 6/2018 | Cao et al. | |
| 2018/0183551 A1 | 6/2018 | Chou et al. | |
| 2018/0279327 A1* | 9/2018 | Ying | H04W 72/0446 |
| 2019/0215781 A1* | 7/2019 | Jeon | H04W 52/325 |
| 2019/0253986 A1* | 8/2019 | Jeon | H04L 5/0048 |
| 2020/0067687 A1* | 2/2020 | Qin | H04L 5/0005 |
| 2020/0107347 A1* | 4/2020 | Basu Mallick | H04W 72/23 |
| 2020/0107358 A1* | 4/2020 | Basu Mallick | H04L 1/1812 |
| 2020/0120651 A1* | 4/2020 | Ma | H04W 72/23 |
| 2020/0382264 A1* | 12/2020 | Aiba | H04L 5/0094 |
| 2021/0006313 A1* | 1/2021 | Rune | H04L 5/0053 |
| 2022/0116171 A1* | 4/2022 | Zhang | H04L 1/1614 |
| 2022/0272745 A1* | 8/2022 | Ma | H04W 48/08 |

FOREIGN PATENT DOCUMENTS

| | | |
|---|---|---|
| CN | 105099634 A | 11/2015 |
| CN | 105472757 A | 4/2016 |
| CN | 106664517 A | 5/2017 |
| KR | 20100048496 A | 5/2010 |
| KR | 101235967 B1 | 2/2013 |
| RU | 2571874 C2 | 12/2015 |
| RU | 2581037 C2 | 4/2016 |
| WO | 2010133043 A1 | 11/2010 |
| WO | 2014021058 A2 | 2/2014 |
| WO | 2017074156 A1 | 5/2017 |

OTHER PUBLICATIONS

Fujitsu, "Discussion on time domain resource allocation", 3GPP TSG RAN WG1 #90, R1-1712742, Aug. 25, 2017, 4 pages, Prague, Czech, Republic.
3GPP TS 38.212 V1.0.0 (2017-09); 3rd Generation Partnership Project; Technical Specification Group Radio Access Network; NR;Multiplexing and channel coding (Release 15); 28 pages.
3GPP TS 38.213 V1.0.0 (Sep. 2017); 3rd Generation Partnership Project; Technical Specification Group Radio Access Network; NR;Physical layer procedures for control (Release 15); 16 pages.
3GPP TS 38.214 V1.0.0 (Sep. 2017); 3rd Generation Partnership Project; Technical Specification Group Radio Access Network; NR; Physical layer procedures for data (Release 15); 32 pages.
3GPP TS 38.331 V0.1.0 (Oct. 2017); 3rd Generation Partnership Project; Technical Specification Group Radio Access Network; NR; Radio Resource Control (RRC); Protocol specification (Release 15); 42 pages.
Guangdong Oppo Mobile Telecom: "Resource allocation for PDSCH/PUSCH", 3GPP TSG RAN WG1 Meeting NR#3; R1-1715690, Sep. 18-21, 2017,13 pages, Nagoya, Japan.
LG Electronics: "Discussion on resource allocation and TBS determination", 3GPP TSG RAN WG1 Meeting NR#3; R1-1715885, Sep. 18-21, 2017, 16 pages, Nagoya, Japan.

(56) References Cited

OTHER PUBLICATIONS

Ericsson,"On Resource Allocation in the Time Domain", 3GPP TSG RAN WG1 #90 R1-1714432, Prague, Czech Republic, Aug. 21-25, 2017, 2 pages.
MCC Support, "Final Report of 3GPP TSG RAN WG1 #90 v1.0.0 (Prague, Czech Rep, 21st Aug. 25, 2017)", 3GPP TSG RAN WG1 Meeting #90bis R1-1716941, Prague, Czech Rep, 9th Oct. 13, 2017, 172 pages.
ETSI TS 136 213 V12.3.0 (Mar. 2019)—LTE; Evolved Universal Terrestrial Radio Access (E-UTRA); Physical layer procedures (3GPP TS 36.213 version 12.3.0 Release 12), 243 pages.
3GPP TS 38.211 V1.0.0 (Sep. 2017), 3rd Generation Partnership Project; Technical Specification Group Radio Access Network; NR; Physical channels and modulation (Release 15), 37 pages.
3GPP TS 38.300 V1.0.1 (Oct. 2017), 3rd Generation Partnership Project; Technical Specification Group Radio Access Network; NR; NR and NG-RAN Overall Description; Stage 2 (Release 15), 62 pages.
3GPP TS 38.133 V0.2.0 (Sep. 2017), 3rd Generation Partnership Project; Technical Specification Group Radio Access Network; New Radio (NR); Requirements for support of radio resource management (Release 15), 15 pages.
Mediatek Inc., "On UL data transmission without grant design and configuration", 3GPP TSG RAN WG1 Meeting NR#3, R1-1716623, Sep. 18-21, 2017, Nagoya, Japan, 7 pages.
Samsung, "DL/UL Resource Allocation", 3GPP TSG RAN WG1 Meeting NR#3, R1-1716004, Sep. 18-21, 2017, Nagoya, Japan, 12 Pages.

\* cited by examiner

INFORMATION TRANSMISSION METHOD AND APPARATUS

CROSS-REFERENCE TO RELATED APPLICATIONS

This application is a continuation of U.S. patent application Ser. No. 16/716,081, filed on Dec. 16, 2019, which is a continuation of International Application No. PCT/CN2018/108288, filed on Sep. 28, 2018, which claims priority to Chinese Patent Application No. 201710922917.0, filed on Sep. 30, 2017. All of the afore-mentioned patent applications are hereby incorporated by reference in their entireties.

TECHNICAL FIELD

This application relates to the communications field, and in particular, to a method and an apparatus for determining a time domain resource used for information transmission in a wireless communications system.

BACKGROUND

In a long term evolution (LTE) system, a network device indicates a frequency domain position of a physical downlink shared channel (PDSCH) or a physical uplink shared channel (PUSCH) on a physical downlink control channel (PDCCH), so that downlink or uplink data transmission can be performed between the network device and a terminal device. In the LTE system, time domain resources of the PDSCH and the PUSCH are remaining time domain symbols, in a subframe, other than a control area.

Different time units are defined in new radio (NR) of a fifth-generation (5G) mobile communications system. For example, the time unit may be a time domain symbol, a mini-slot, a slot, a subframe, or a frame. The time domain symbol herein may be an orthogonal frequency division multiplexing (OFDM) symbol. One frame has a time length of 10 milliseconds (ms), and includes 10 subframes. Each subframe has a time length of 1 ms. A time length corresponding to one slot depends on a magnitude of a subcarrier spacing. When the subcarrier spacing is 15 kilohertz (kHz), the time length corresponding to one slot is 1 ms. When the subcarrier spacing is 60 kHz, the time length corresponding to one slot is 0.25 ms. A quantity of time domain symbols included in one slot is related to a length of a cyclic prefix (CP). In an extended cyclic prefix case, one slot includes 12 time domain symbols. In a normal CP case, one slot includes 14 time domain symbols.

The international telecommunication union (ITU) defines three major application scenarios for 5G and future mobile communications systems: enhanced mobile broadband (eMBB), ultra-reliable and low latency communications (URLLC), and massive machine type communications (mMTC). Typical URLLC services include: radio control in an industrial manufacturing or production procedure, motion control and remote repair for a self-driving automobile and a self-driving air plane, and tactile interactive applications such as remote medical surgery. These services are mainly characterized in requirements for ultrahigh reliability and a low latency, a relatively small transmission data volume, and burst. URLLC service data has very high requirements on reliability and a latency. A transmission latency is required to be within 1 ms on the premise that 99.999% reliability is achieved. To improve transmission reliability of the URLLC service data, a quantity of bits of a control channel of the URLLC service, including a quantity of bits used to indicate a time domain resource occupied by a data channel of the URLLC service, needs to be decreased, thereby improving reliability of the control channel of the URLLC service.

SUMMARY

This application provides an information transmission method, to effectively reduce a payload size of downlink control information by flexibly selecting a time domain resource for information transmission, thereby improving transmission reliability of a control channel, and improving reliability of data transmission.

According to a first aspect, an information transmission method is provided. The method may be applied to a terminal device or a wireless relay device, or may be applied to a chip of a terminal device or a chip of a wireless relay device. The method includes: receiving first information, where the first information includes at least one of a service type, time domain resource length set information, a detection period of downlink control information, and a control resource set CORESET configuration period, the first information corresponds to a first time domain resource or a time domain resource set, the time domain resource set includes at least one first time domain resource, and the first time domain resource is a time domain resource occupied by a physical channel on which information transmission is to be performed between the terminal device and a network device; determining, based on the first information, the first time domain resource occupied by the physical channel on which the information transmission is to be performed; and performing information transmission on the first time domain resource and through the physical channel. The time domain resource for the information transmission is flexibly selected based on the first information. For a particular scenario, a quantity of bits that are indicated by using a physical downlink control channel is decreased, to improve transmission reliability of the physical downlink control channel.

In a possible implementation of the first aspect, the first information is received by using radio resource control RRC signaling. The first information is notified by using the RRC signaling. Compared with notification using PDCCH signaling, signaling overheads of the PDCCH can be reduced, and the transmission reliability of the PDCCH can be improved.

In a possible implementation of the first aspect, the determining, based on the first information, the first time domain resource occupied by the physical channel on which the information transmission is to be performed includes: determining duration of the physical channel based on the first information; or determining a location of an end symbol of the physical channel based on the first information; or determining a location of a start symbol of the physical channel and duration of the physical channel based on the first information; or determining a location of a start symbol of the physical channel and a location of an end symbol of the physical channel based on the first information. In this implementation, the first information corresponds to the first time domain resource.

In a possible implementation of the first aspect, second information is received. The second information is carried in the downlink control information, the second information is used to indicate an index of the first time domain resource in the time domain resource set, the time domain resource set includes the at least one first time domain resource, and the time domain resource set corresponds to the first information. The determining, based on the first information, the first time domain resource occupied by the physical channel on which the information transmission is to be performed includes: determining duration of the physical channel based on the first information and the second information; or determining a location of an end symbol of the physical channel based on the first information and the second information; or determining a location of a start symbol of the physical channel and duration of the physical channel based on the first information and the second information; or determining a location of a start symbol of the physical channel and a location of an end symbol of the physical channel based on the first information and the second information. In this implementation, the first information corresponds to the time domain resource set. The first information may be predefined in a system or predefined in a protocol, or may be determined by the network device and then notified to the terminal device by using the RRC signaling. Only the second information needs to be carried on the PDCCH to indicate index information of the first time domain resource in the time domain resource set, thereby decreasing a quantity of bits of the control information carried on the PDCCH, and improving the transmission reliability of the PDCCH.

In a possible implementation of the first aspect, the physical channel is a physical downlink shared channel or a physical uplink shared channel.

According to a second aspect, an information transmission method is provided. The method may be applied to a network device, or may be applied to a chip of a network device. The method is a network-side method that corresponds to the first aspect, and therefore, can also implement beneficial effects in the first aspect. The method includes: sending first information, where the first information includes at least one of a service type, time domain resource length set information, a detection period of downlink control information, and a control resource set CORESET configuration period, the first information corresponds to a first time domain resource or a time domain resource set, the time domain resource set includes at least one first time domain resource, and the first time domain resource is a time domain resource occupied by a physical channel on which information transmission is to be performed between a terminal device and the network device; and performing information transmission on the first time domain resource and through the physical channel.

In a possible implementation of the second aspect, the first information is sent by using radio resource control RRC signaling.

In a possible implementation of the second aspect, second information is sent. The second information is carried in the downlink control information, and the second information is used to indicate an index of the first time domain resource in the time domain resource set.

In a possible implementation of the second aspect, the physical channel is a physical downlink shared channel or a physical uplink shared channel.

According to a third aspect, an information transmission method is provided. The method may be applied to a terminal device or a wireless relay device, or may be applied to a chip of a terminal device or a chip of a wireless relay device. The method is parallel to the first aspect and can also implement beneficial effects of the first aspect. The method includes: receiving downlink control information, where a format of the downlink control information corresponds to a first time domain resource or a time domain resource set, the time domain resource set includes at least one first time domain resource, and the first time domain resource is a time domain resource occupied by a physical channel on which information transmission is to be performed between the terminal device and a network device; determining the format of the downlink control information; determining, based on the format of the downlink control information, the first time domain resource occupied by the physical channel on which the information transmission is to be performed; and performing information transmission on the first time domain resource and through the physical channel.

In a possible implementation of the third aspect, the determining, based on the format of the downlink control information, the first time domain resource occupied by the physical channel on which the information transmission is to be performed includes: determining duration of the physical channel based on the format of the downlink control information; or determining a location of an end symbol of the physical channel based on the format of the downlink control information; or determining a location of a start symbol of the physical channel and duration of the physical channel based on the format of the downlink control information; or determining a location of a start symbol of the physical channel and a location of an end symbol of the physical channel based on the format of the downlink control information. In this implementation, the format of the downlink control information corresponds to the first time domain resource.

In a possible implementation of the third aspect, second information is received. The second information is carried in the downlink control information, the second information is used to indicate an index of the first time domain resource in the time domain resource set. The time domain resource set includes the at least one first time domain resource, and the time domain resource set corresponds to first information. The determining, based on the format of the downlink control information, the first time domain resource occupied by the physical channel on which the information transmission is to be performed includes: determining duration of the physical channel based on the format of the downlink control information and the second information; or determining a location of an end symbol of the physical channel based on the format of the downlink control information and the second information; or determining a location of a start symbol of the physical channel and duration of the physical channel based on the format of the downlink control information and the second information; or determining a location of a start symbol of the physical channel and a location of an end symbol of the physical channel based on the format of the downlink control information and the second information. In this implementation, the format of the downlink control information corresponds to the time domain resource set. Only the second information needs to be carried on a PDCCH to indicate index information of the first time domain resource in the time domain resource set, thereby decreasing a quantity of bits of the control information carried on the PDCCH, and improving transmission reliability of the PDCCH.

In a possible implementation of the third aspect, the physical channel is a physical downlink shared channel or a physical uplink shared channel.

According to a fourth aspect, an information transmission method is provided. The method may be applied to a network device, or may be applied to a chip of a network device. The method is a network-side method that corresponds to the third aspect, and therefore, can also implement beneficial effects in the third aspect. The method includes: sending downlink control information, where a format of the downlink control information corresponds to a first time domain resource or a time domain resource set, the time domain resource set includes at least one first time domain resource, and the first time domain resource is a time domain resource occupied by a physical channel on which information transmission is to be performed; and performing information transmission on the first time domain resource and through the physical channel.

In a possible implementation of the fourth aspect, second information is sent. The second information is carried in the downlink control information, and the second information is used to indicate an index of the first time domain resource in the time domain resource set.

In a possible implementation of the fourth aspect, the physical channel is a physical downlink shared channel or a physical uplink shared channel.

According to a fifth aspect, an information transmission method is provided. The method may be applied to a terminal device or a wireless relay device, or may be applied to a chip of a terminal device or a chip of a wireless relay device. The method includes: determining first information, where the first information includes at least one of a service type, a format of downlink control information, time domain resource length set information, a detection period of the downlink control information, and a control resource set CORESET configuration period; determining, based on the first information, a first time domain resource occupied by a physical channel on which information transmission is to be performed; and performing information transmission on the first time domain resource and through the physical channel. The time domain resource for the information transmission is flexibly selected based on the first information. For a particular scenario, a quantity of bits that are indicated by using a physical downlink control channel is decreased, to improve transmission reliability of the physical downlink control channel.

In a possible implementation of the fifth aspect, when the first information includes at least one of the service type, the time domain resource length set information, the detection period of the downlink control information, and the CORESET configuration period, the determining first information specifically includes: receiving the first information by using radio resource control RRC signaling. The first information is notified by using the RRC signaling. Compared with notification using PDCCH signaling, signaling overheads of the PDCCH can be reduced, and the transmission reliability of the PDCCH can be improved.

In a possible implementation of the fifth aspect, when the first information includes the format of the downlink control information, the determining first information specifically includes: receiving the downlink control information, and determining the format of the downlink control information.

In a possible implementation of the fifth aspect, the determining, based on the first information, a first time domain resource occupied by a physical channel on which information transmission is to be performed includes: determining duration of the physical channel based on the first information; or determining a location of an end symbol of the physical channel based on the first information; or determining a location of a start symbol of the physical channel and duration of the physical channel based on the first information; or determining a location of a start symbol of the physical channel and a location of an end symbol of the physical channel based on the first information. In this implementation, the first information corresponds to the first time domain resource.

In a possible implementation of the fifth aspect, second information is received. The second information is carried in the downlink control information, the second information is used to indicate an index of the first time domain resource in a time domain resource set, the time domain resource set includes at least one first time domain resource, and the time domain resource set corresponds to the first information. The determining, based on the first information, a first time domain resource occupied by a physical channel on which information transmission is to be performed includes: determining duration of the physical channel based on the first information and the second information; or determining a location of an end symbol of the physical channel based on the first information and the second information; or determining a location of a start symbol of the physical channel and duration of the physical channel based on the first information and the second information; or determining a location of a start symbol of the physical channel and a location of an end symbol of the physical channel based on the first information and the second information. In this implementation, the first information corresponds to the time domain resource set. The first information may be predefined in a system or predefined in a protocol, or may be determined by a network device and then notified to the terminal device by using the RRC signaling. Only the second information needs to be carried on the PDCCH to indicate index information of the first time domain resource in the time domain resource set, thereby decreasing a quantity of bits of the control information carried on the PDCCH, and improving the transmission reliability of the PDCCH.

In a possible implementation of the fifth aspect, the physical channel is a physical downlink shared channel or a physical uplink shared channel.

According to a sixth aspect, an information transmission method is provided. The method may be applied to a network device, or may be applied to a chip of a network device. The method is a network-side method that corresponds to the fifth aspect, and therefore, can also implement beneficial effects in the fifth aspect. The method includes: determining first information, where the first information includes at least one of a service type, a format of downlink control information, time domain resource length set information, a detection period of the downlink control information, and a control resource set configuration period; determining, based on the first information, a first time domain resource occupied by a physical channel on which information transmission is to be performed; and performing information transmission on the first time domain resource and through the physical channel.

In a possible implementation of the sixth aspect, when the first information includes at least one of the service type, the time domain resource length set information, the detection period of the downlink control information, and the CORESET configuration period, the method further includes: sending the first information by using radio resource control RRC signaling.

In a possible implementation of the sixth aspect, second information is sent. The second information is carried in the downlink control information, the second information is used to indicate an index of the first time domain resource in a time domain resource set, the time domain resource set includes at least one first time domain resource, and the time domain resource set corresponds to the first information.

According to a seventh aspect, a communications apparatus is provided. The communications apparatus includes a processing unit and a transceiver unit, to perform the method according to the first aspect or any possible implementation of the first aspect, or perform the method according to the third aspect or any possible implementation of the third aspect, or perform the method according to the fifth aspect or any possible implementation of the fifth aspect. The transceiver unit performs information receiving, sending, and transmission functions in the foregoing method, and the processing unit performs a data processing function in the foregoing method.

According to an eighth aspect, a communications apparatus is provided. The communications apparatus includes a processor and a transceiver, and optionally, further includes a memory, to perform the method according to the first aspect or any possible implementation of the first aspect, or perform the method according to the third aspect or any possible implementation of the third aspect, or perform the method according to the fifth aspect or any possible implementation of the fifth aspect. The transceiver performs information receiving, sending, and transmission functions in the foregoing method, and the processor performs a data processing function in the foregoing method.

According to a ninth aspect, a communications apparatus is provided. The communications apparatus includes a processing unit and a transceiver unit, to perform the method according to the second aspect or any possible implementation of the second aspect, or perform the method according to the fourth aspect or any possible implementation of the fourth aspect, or perform the method according to the sixth aspect or any possible implementation of the sixth aspect. The transceiver unit performs information receiving, sending, and transmission functions in the foregoing method, and the processing unit performs a data processing function in the foregoing method.

According to a tenth aspect, a communications apparatus is provided. The communications apparatus includes a processor and a transceiver, and optionally, further includes a memory, to perform the method according to the second aspect or any possible implementation of the second aspect, or perform the method according to any one of the fourth aspect or any possible implementation of the fourth aspect, or perform the method according to any one of the sixth aspect or any possible implementation of the sixth aspect. The transceiver performs information receiving, sending, and transmission functions in the foregoing method, and the processor performs a data processing function in the foregoing method.

According to an eleventh aspect, a computer-readable storage medium is provided. The computer-readable storage medium stores an instruction, and when the instruction is run on a computer, the computer is enabled to perform the method according to the first aspect or any possible implementation of the first aspect, or perform the method according to the third aspect or any possible implementation of the third aspect, or perform the method according to the fifth aspect or any possible implementation of the fifth aspect.

According to a twelfth aspect, a computer-readable storage medium is provided. The computer-readable storage medium stores an instruction, and when the instruction is run on a computer, the computer is enabled to perform the method according to the second aspect or any possible implementations of the second aspect, or perform the method according to the fourth aspect or any possible implementations of the fourth aspect, or perform the method according to the sixth aspect or any possible implementations of the sixth aspect.

According to a thirteenth aspect, a computer program product including an instruction is provided. When the computer program product is run on a computer, the computer is enabled to perform the method according to the first aspect or any possible implementation of the first aspect, or perform the method according to the third aspect or any possible implementation of the third aspect, or perform the method according to the fifth aspect or any possible implementation of the fifth aspect.

According to a fourteenth aspect, a computer program product including an instruction is provided. When the computer program product is run on a computer, the computer is enabled to perform the method according to the second aspect or any possible implementation of the second aspect, or perform the method according to any one of the fourth aspect or any possible implementation of the fourth aspect, or perform the method according to the sixth aspect or any possible implementation of the sixth aspect.

According to a fifteenth aspect, a chip product of a network device is provided, to perform the method according to the first aspect or any possible implementation of the first aspect, or perform the method according to the third aspect or any possible implementation of the third aspect, or perform the method according to the fifth aspect or any possible implementation of the fifth aspect.

According to a sixteenth aspect, a chip product of a terminal device is provided, to perform the method according to the second aspect or any possible implementation of the second aspect, or perform the method according to the fourth aspect or any possible implementation of the fourth aspect, or perform the method according to the sixth aspect or any possible implementation of the sixth aspect.

DETAILED DESCRIPTION OF ILLUSTRATIVE EMBODIMENTS

Figure 1:
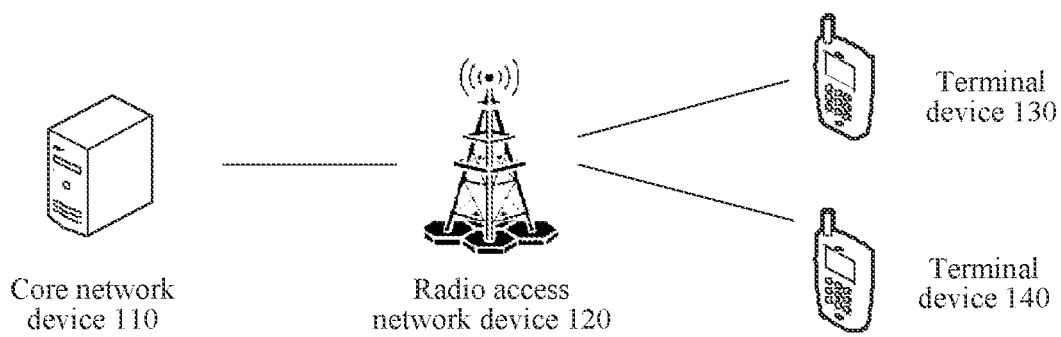
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is wirelessly connected to the radio access network device, and the radio access network device is connected to the core network device wirelessly or in a wired manner. The core network device and the radio access network device may be different physical devices independent of each other. Alternatively, functions of the core network device and a logical function of the radio access network device are integrated into a same physical device. Alternatively, some functions of the core network device and some functions of the radio access network device are integrated into one physical device. The terminal device may be at a fixed location or may be movable. FIG. 1 is merely a schematic diagram. The communications system may further include other network devices, for example, may further include a wireless relay device and a wireless backhaul device, not drawn in FIG. 1. A quantity of core network devices, a quantity of radio access network devices, and a quantity of terminal devices that are included in the mobile communications system are not limited in this embodiment of this application.

The radio access network device is an access device that is in the mobile communications system and that is wirelessly accessed by the terminal device, and may be a NodeB, an evolved NodeB (eNodeB), a base station in a 5G mobile communications system or in a new radio (NR) communications system, a base station in a future mobile communications system, an access node in a Wi-Fi system, or the like. A specific technology used for and a specific device form of the radio access network device are not limited in this embodiment of this application. The radio access network device may further include a wireless relay device (not shown in FIG. 1), and the base station accesses the core network device no by using the wireless relay device. In this application, the radio access network device is referred to as a network device for short. Unless particularly specified, all network devices are radio access network devices in this application. In this application, "5G" may be equivalent to "NR".

The terminal device may also be referred to as a terminal, user equipment (UE), a mobile station (MS), a mobile terminal (MT), and the like. The terminal device may be a mobile phone, a tablet computer (Pad), a computer with a wireless receiving and sending function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including indoor or outdoor, handheld, or in-vehicle; may be deployed on water; or may be deployed on an air plane, a balloon, and an artificial satellite in air. An application scenario of the radio access network device and the terminal device is not limited in this embodiment of this application.

During information transmission in the embodiments of this application, communication may be performed by using a licensed spectrum, may be performed by using an unlicensed spectrum, or may be performed by using both a licensed spectrum and an unlicensed spectrum. Communication may be performed between the radio access network device and the terminal device and between the terminal devices by using a spectrum below 6 gigahertz (GHz), or by using a spectrum above 6 GHz, or by using both a spectrum below 6 GHz and a spectrum above 6 GHz. A spectrum resource used for the information transmission is not limited in the embodiments of this application.

The embodiments of this application may be applied to the following information transmission scenarios: downlink information transmission, uplink information transmission, device-to-device (D2D) information transmission, and wireless relay information transmission. For the downlink information transmission, a sending device is a radio access network device, and a corresponding receiving device is a terminal device. For the uplink information transmission, a sending device is a terminal device, and a corresponding receiving device is a radio access network device. For the D2D information transmission, a sending device is a terminal device, and a corresponding receiving device is also a terminal device. For the wireless relay information transmission, a sending device is a wireless relay device or a base station, and a receiving device is a wireless relay device or a base station. A signal transmission direction is not limited in the embodiments of this application.

Descriptions are provided below by using the downlink information transmission and the uplink information transmission as examples. However, a method in this application can also be applied to the D2D information transmission and the wireless relay information transmission.

For ease of understanding this application, some basic concepts in this application are first described below.

(i) Control Channel and Data Channel

A network device may send data to a terminal device through a data channel. To enable the terminal device to correctly receive the data on the data channel, the network device and the terminal device need to reach consistent understanding on some transmission parameters for data transmission. For example, these parameters may include information such as a modulation and coding scheme (MCS), a transport block size (TBS), a redundancy version (RV), a hybrid automatic repeat request (HARQ) process number, resource block assignment (RA), precoding information (PCI), or a precoding indicator (PCI). These transmission parameters may be predefined in a protocol, or may be sent from the network device to the terminal device by using signaling. In this application, unless particularly specified, the signaling may include at least one of radio resource control (RRC) signaling, media access control (MAC) layer signaling, and physical layer signaling.

These transmission parameters are used to control data transmission on the data channel. After obtaining these transmission parameters, the terminal device may receive the data on the data channel, and demodulate and decode the received data. For example, for the downlink data transmission, the data channel may be a physical downlink shared channel (PDSCH), and control parameters for controlling the data transmission on the PDSCH are transmitted through a physical downlink control channel (PDCCH). For the uplink data transmission, the data channel may be a physical uplink shared channel (PUSCH), and control parameters for controlling the data transmission on the PUSCH are transmitted from the network device to the terminal device through the PDCCH.

In this application, descriptions are provided by using an example in which the control channel is the PDCCH and the data channel is the PDSCH and the PUSCH. The control channel may be equivalent to the PDCCH in terms of description. However, specific names of the control channel and the data channel are not limited in this application.

It should be noted that, in addition to the data, control information may further be transmitted on the PDSCH and the PUSCH. In this application, information transmission may be data transmission on the PDSCH or the PUSCH, or may be control information transmission on the PDSCH or the PUSCH.

(2) The PDCCH carries downlink control information (DCI).

The PDCCH carries scheduling and allocation information and other control information, and information carried on the PDCCH may be collectively referred to as the DCI. The foregoing transmission parameters may be a part of the DCI. Payload sizes of the DCI may be different in different scenarios. Consequently, formats of the DCI may be different, and resource sizes used to transmit the PDCCH may be different. For example, a payload size of the DCI for scheduling the uplink data transmission may be different from that for scheduling the downlink data transmission. A payload size of the DCI for scheduling single-stream downlink data transmission may be different from that for scheduling multi-stream downlink data transmission. A payload size of the DCI for scheduling an eMBB service may be different from that for scheduling a URLLC service.

To enhance an error detection capability of the terminal device for the DCI, the network device performs cyclic redundancy code (CRC) check on the DCI, to generate a corresponding CRC. To distinguish DCI in different scenarios, for different purposes, and in different formats, the network device scrambles the CRC by using different radio network temporary identifiers (RNTI). The scrambled CRC and the DCI are channel coded and modulated, and then are mapped to the PDCCH and sent to the terminal device.

In this application, the format of the DCI includes the payload size of the DCI, the RNTI, and definitions of fields included in the DCI. That payload sizes of the DCI are different may be considered as that formats of the DCI are different; that RNTIs for scrambling are different may also be considered as that formats of the DCI are different; that the definitions of the fields included in the DCI are different may also be considered as that the formats of the DCI are different. The definition of the field herein may include a location of the field in the DCI, a bit length of the field, and a specific meaning indicated by the field. The payload size herein may be a total quantity of bits of the fields in the DCI, or may be a total quantity of bits of the fields in the DCI plus a length of the CRC.

(3) Control Resource Set (CORESET)

Figure 2:
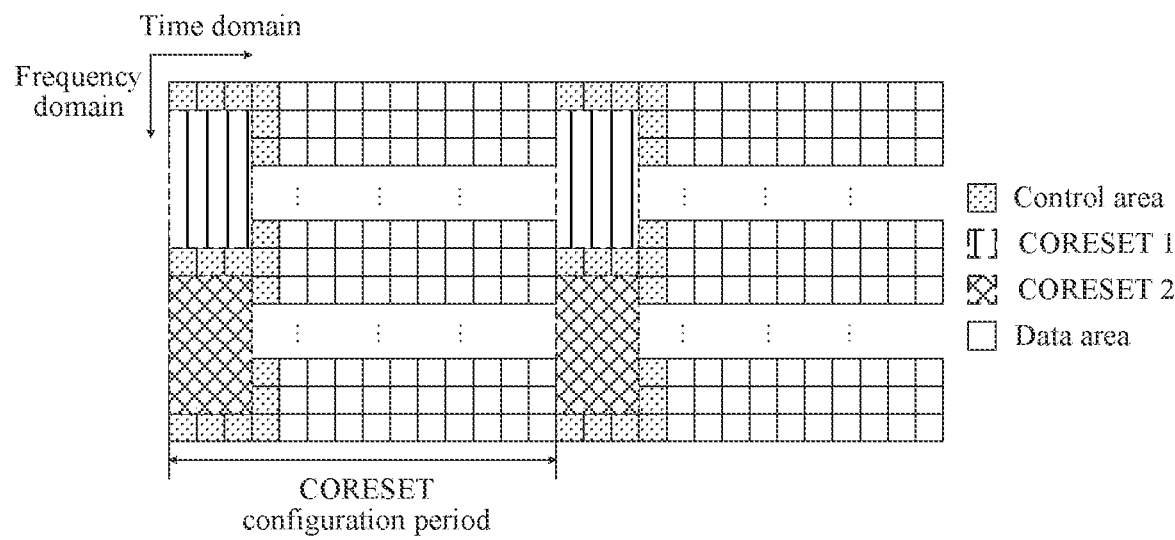
FIG. 2 is a schematic diagram of a control resource set according to an embodiment of this application.

FIG. 2 is a schematic diagram of a CORESET according to an embodiment of this application. As shown in FIG. 2, one CORESET is a time-frequency resource that is consecutive in time domain and consecutive or non-consecutive in frequency domain, and is used to carry the PDCCH. One CORESET may correspond to one user equipment (UE), or may correspond to a group of UEs. For example, a CORESET 1 corresponds to UE 1, UE 2, UE 3, and UE 4, and a CORESET 2 corresponds to UE 4, UE 5, UE 6, and UE 7. PDCCHs of the UE 1, the UE 2, the UE 3, and the UE 4 may be sent on the CORESET 1, and PDCCHs of the UE 4, the UE 5, the UE 6, and the UE 7 may be sent on the CORESET 2. One user may correspond to a plurality of CORESETs, and numerologies on these CORESETs may be the same or may be different. The numerology herein includes a subcarrier spacing and a cyclic prefix (CP) length. An interval between two neighboring locations of a same CORESET in time domain is referred to as a CORESET configuration period. As shown in FIG. 2, an interval between two neighboring CORESETs 2 is referred to as a configuration period of the CORESET 2.

In NR, various scheduling scenarios, including slot based scheduling and non-slot based scheduling, may be supported. The slot based scheduling further includes single-slot scheduling and multi-slot scheduling. The non-slot based scheduling is also referred to as single-mini-slot based scheduling, multi-mini-slot based scheduling, single-symbol level scheduling, or multi-symbol level scheduling. Due to diversity of the scheduling scenarios, the terminal device needs to obtain time domain resource information for scheduling, to determine a time domain resource occupied by the PDSCH or the PUSCH in this data transmission. In this application, unless particularly specified, a symbol is equivalent to a time domain symbol, and the time domain resource may be one or more slots, one or more mini-slots, or one or more symbols. The time domain resource may be consecutive or discrete in terms of time.

If a time domain resource occupied for data transmission is discrete in terms of time, a bitmap may be added to the DCI to indicate the time domain resource. As shown in FIG. 2, a data area in one slot has ten symbols. If one scheduling is performed within one slot, a 10-bit bitmap may be used to indicate a time domain resource occupied by this scheduling.

If a time domain resource occupied for data transmission is consecutive in terms of time, the time domain resource occupied for the data transmission may be determined by using a start symbol of the data transmission and duration of the data transmission. For example, if the start symbol is the fifth symbol, and the duration is four symbols, it may be determined that the time domain resource occupied for the data transmission is four symbols: the fifth, the sixth, the seventh, and the eighth symbols. Alternatively, the time domain resource occupied for the data transmission may be determined by using a start symbol and an end symbol of the data transmission. For example, if the start symbol is the fifth symbol, and the end symbol is the eighth symbol, it may also be determined that the time domain resource occupied for the data transmission is the four symbols: the fifth, the sixth, the seventh, and the eighth symbols. For a slot including 14 symbols, there are 105 combinations of start symbols and end symbols in total. If a method for directly indicating the time domain resource in the DCI is used, seven bits are required. If the multi-slot scheduling is considered, more bits are required to indicate the time domain resource. A requirement of the URLLC service on PDCCH reliability is very high, and an excessively large DCI payload size causes the PDCCH reliability to be difficult to satisfy the requirement of the URLLC service.

Figure 3:
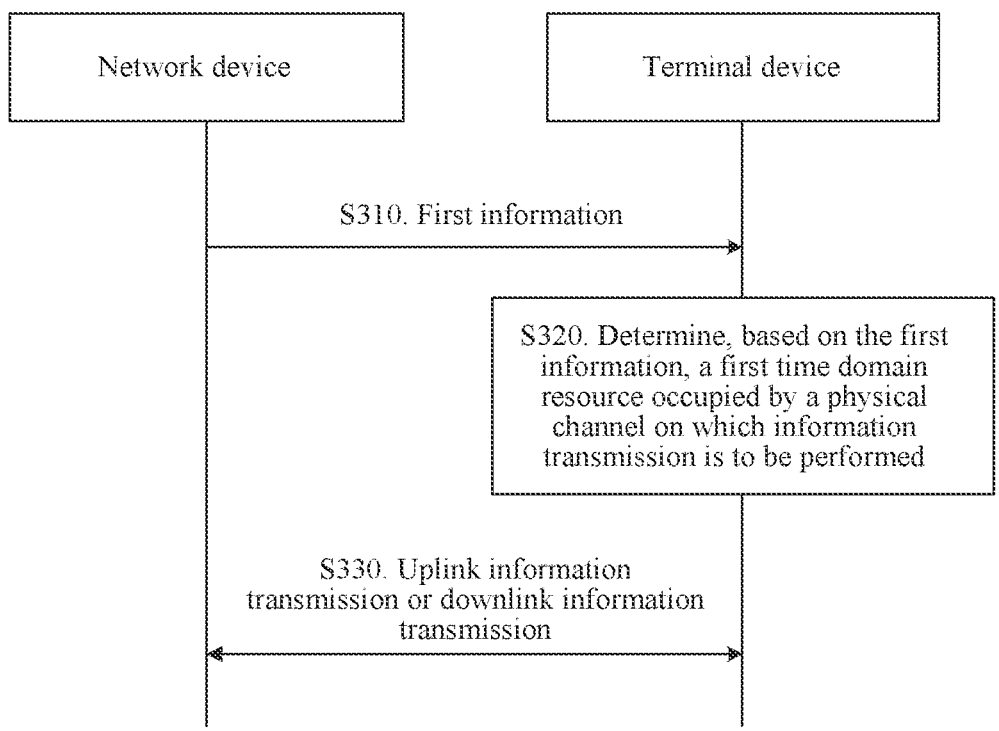
FIG. 3 is a schematic diagram of an information transmission method according to an embodiment of this application.

As shown in FIG. 3, this application provides an information transmission method. In the information transmission method, a method for determining, in different scheduling scenarios, a time domain resource occupied for data transmission is adaptively selected, to effectively reduce a payload size of a PDCCH, thereby improving reliability of the PDCCH, and improving reliability of the data transmission.

S310. A network device sends first information to a terminal device, where the first information includes at least one of a service type, time domain resource length set information, a detection period of downlink control information, and a control resource set CORESET configuration period, the first information corresponds to a first time domain resource or a time domain resource set, the time domain resource set includes at least one first time domain resource, and the first time domain resource is a time domain resource occupied by a physical channel on which information transmission is to be performed between the terminal device and the network device. The first information may be carried by using signaling. Correspondingly, the terminal device receives the first information.

That the first information corresponds to the first time domain resource or the time domain resource set herein may alternatively be understood as that the first information is used to indicate the first time domain resource or the time domain resource set. For example, the terminal device receives content in the first information, to determine the first time domain resource or the time domain resource set that corresponds to the first information. For another example, the terminal device receives content in the first information, and the content directly indicates the first time domain resource or the time domain resource set.

In this application, the physical channel for the information transmission may be a control channel or a data channel. For downlink information transmission, the physical channel may be a PDSCH. For uplink information transmission, the physical channel may be a PUSCH.

The time domain resource may be determined by using any two of a start location, an end location, and duration. Units of the start location, the end location, and the duration may be any one of a time domain symbol, a mini-slot, a slot, a subframe, and a frame. When the units of the start location and the end location are the time domain symbol, the start location and the end location may be absolute locations in a slot or may be relative locations in a slot that are relative to the PDCCH. When the units of the start location and the end location are the mini-slot, the start location and the end location may be absolute locations in a slot or may be relative locations in a slot that are relative to the PDCCH; the start location and the end location may be absolute locations in a subframe or may be relative locations in a subframe that are relative to a PDCCH; or the start location and the end location may be absolute locations in a frame or may be relative locations in a frame that are relative to the PDCCH. The units of the start location, the end location, and the duration may be the same or may be different. For example, the start location is an absolute location in a slot, and the unit of the duration is the mini-slot. For example, the start location is a symbol 0, and the duration is two mini-slots. If a length of the mini-slot and the unit of the duration are predefined or configured by using higher layer signaling, the time domain resource may be determined by using the foregoing several pieces of information.

The service type herein may include an eMBB service, a URLLC service, and an mMTC service. The service type may further be refined based on a QoS requirement, or may further be refined with reference to a category (for example, a gold user, a silver user, or a bronze user) of a terminal user. The service type may be notified by the network device to the terminal device by using signaling, for example, may be notified to the terminal device by using RRC signaling or may be notified to the terminal device by using a logical channel type.

A time domain resource length set is a set of possible duration of the information transmission. The possible duration of the information transmission may be one to 14 symbols, one or more mini-slots, or one or more slots. For example, if the possible duration of the information transmission is one symbol, two symbols, four symbols, seven symbols, or 14 symbols, the time domain resource length set is {1, 2, 4, 7, 14}. A same time domain resource length set or different time domain resource length sets may be predefined for different service types in a system or a protocol. When time domain resource length sets of different service types are the same, the network device does not need to send the time domain resource length set information to the terminal device. When time domain resource length sets of different service types are different, the terminal device may obtain the service type by using signaling, and then determine a corresponding time domain resource length set based on the service type. The time domain resource length set may alternatively be determined by the network device, and then notified to the terminal device by using signaling, for example, notified to the terminal device by using RRC signaling. The time domain resource length set information notified to the terminal device by using the signaling may be an index or a number of the time domain resource length set.

The detection period of the downlink control information may be predefined in a system or a protocol. In this case, the network device does not need to send the detection period of the downlink control information to the terminal device by using signaling. The detection period of the downlink control information may alternatively be determined by the network device based on different requirements, and then the network device notifies the terminal device of the detection period of the downlink control information by using signaling.

The CORESET configuration period may be predefined in a system or a protocol. In this case, the network device does not need to send the CORESET configuration period to the terminal device by using signaling. The CORESET configuration period may alternatively be determined by the network device based on different requirements, and then the network device notifies the terminal device of the CORESET configuration period by using signaling.

S320. The terminal device determines, based on the first information, the first time domain resource occupied by the physical channel on which the information transmission is to be performed with the network device.

When the first information corresponds to the first time domain resource, the terminal device may directly determine, based on the first information, the first time domain resource occupied by the physical channel on which the information transmission is to be performed. Specifically, when a location of a start symbol of the physical channel is determined in a system or a protocol, the terminal device may determine, based on the first information, duration (duration) of the physical channel, or determine, based on the first information, a location of an end symbol of the physical channel. The terminal device may determine, based on the first information, the location of the start symbol of the physical channel and the duration of the physical channel, or determine, based on the first information, the location of the start symbol of the physical channel and the location of the end symbol of the physical channel. The duration of the physical channel may also be referred to as a time length of the physical channel.

The location of the start symbol and the location of the end symbol of the physical channel herein may be relative to a location of a start symbol of the PDCCH. For example, if the location of the start symbol of the PDCCH is numbered 3 in a slot, and the location of the start symbol of the physical channel is numbered 7 in the slot, a value of the location of the start symbol of the physical channel is 4. If the location of the start symbol of the PDCCH is numbered 3 in a slot, and the location of the start symbol of the physical channel is numbered 3 in the slot, a value of the location of the start symbol of the physical channel is 0. The foregoing location numbering starts from 0. It may be understood that the location numbering may alternatively start from 1. The location of the start symbol and the location of the end symbol of the physical channel may alternatively be absolute numbers of symbol locations in a slot. For example, for a slot including 14 symbols, the symbol location is a number ranging from 0 to 13.

When the first information corresponds to the time domain resource set, the first information may be used to indicate the time domain resource set, and then an index of the first time domain resource in the time domain resource set is indicated by using second information, so that the first time domain resource occupied by the physical channel used for the information transmission is determined.

Specifically, the network device sends the second information to the terminal device. The second information is carried in the downlink control information, and the second information is used to indicate the index of the first time domain resource in the time domain resource set. After obtaining the second information, the terminal device determines duration of the physical channel based on the first information and the second information; or determine a location of an end symbol of the physical channel based on the first information and the second information; or determine a location of a start symbol of the physical channel and duration of the physical channel based on the first information and the second information; or determine a location of a start symbol of the physical channel and a location of an end symbol of the physical channel based on the first information and the second information.

S330. The terminal device and the network device perform information transmission on the first time domain resource and through the physical channel.

Specifically, for the downlink information transmission, the network device sends information on the first time domain resource and through the physical channel, and the terminal device receives the information on the first time domain resource and through the physical channel. For the uplink information transmission, the terminal device sends information on the first time domain resource and through the physical channel, and the network device receives the information on the first time domain resource and through the physical channel.

Figure 4:
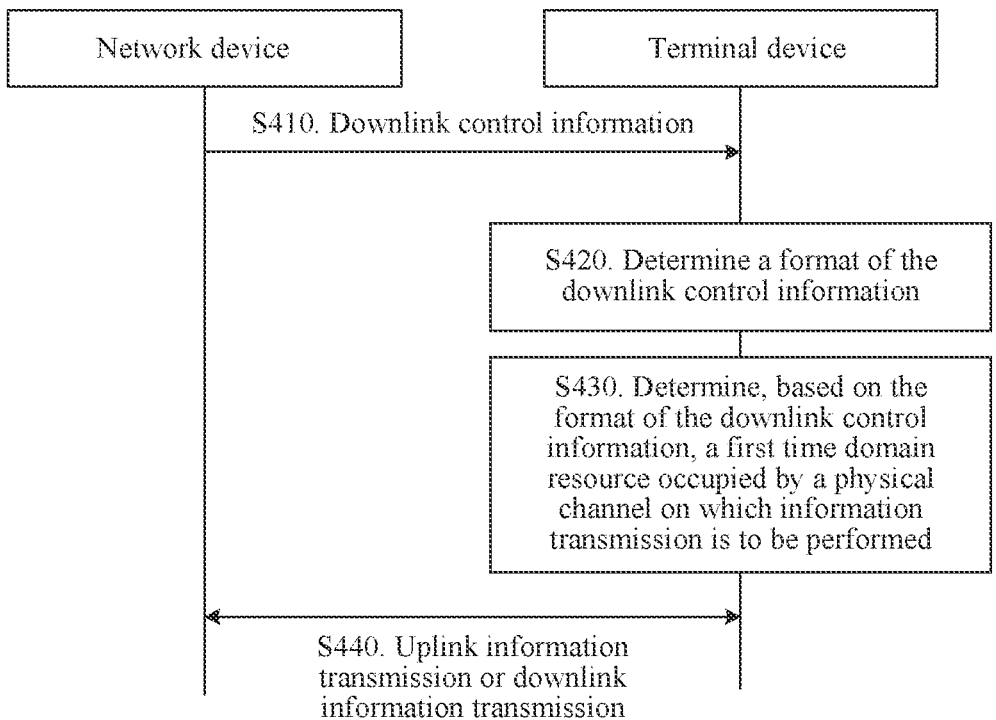
FIG. 4 is a schematic diagram of another information transmission method according to an embodiment of this application.

As shown in FIG. 4, this application provides another information transmission method. The information transmission method determines, in different scheduling scenarios, a time domain resource occupied for data transmission based on a format of downlink control information, to effectively reduce a payload size of a PDCCH, thereby improving reliability of the PDCCH, and improving reliability of the data transmission.

S410. A network device sends the downlink control information to a terminal device, where the format of the downlink control information corresponds to a first time domain resource or a time domain resource set, the time domain resource set includes at least one first time domain resource, and the first time domain resource is a time domain resource occupied by a physical channel on which information transmission is to be performed between the terminal device and the network device. Correspondingly, the terminal device receives the downlink control information. Specifically, the downlink control information may be carried on the PDCCH.

S420. The terminal device determines the format of the downlink control information. Specifically, the terminal device detects the downlink control information on a configured CORESET to determine the format of the downlink control information.

S430. The terminal device determines, based on the format of the downlink control information, the first time domain resource occupied by the physical channel on which the information transmission is to be performed with the network device. Specifically, a method for determining, based on the format of the downlink control information, the first time domain resource occupied by the physical channel on which the information transmission is to be performed may be directly obtained with reference to the method for determining, based on the first information, the first time domain resource occupied by the physical channel on which the information transmission is to be performed in S320.

S440. The terminal device and the network device perform information transmission on the first time domain resource and through the physical channel. For a specific information transmission method, refer to the related descriptions in S330. Details are not described herein again.

Figure 5:
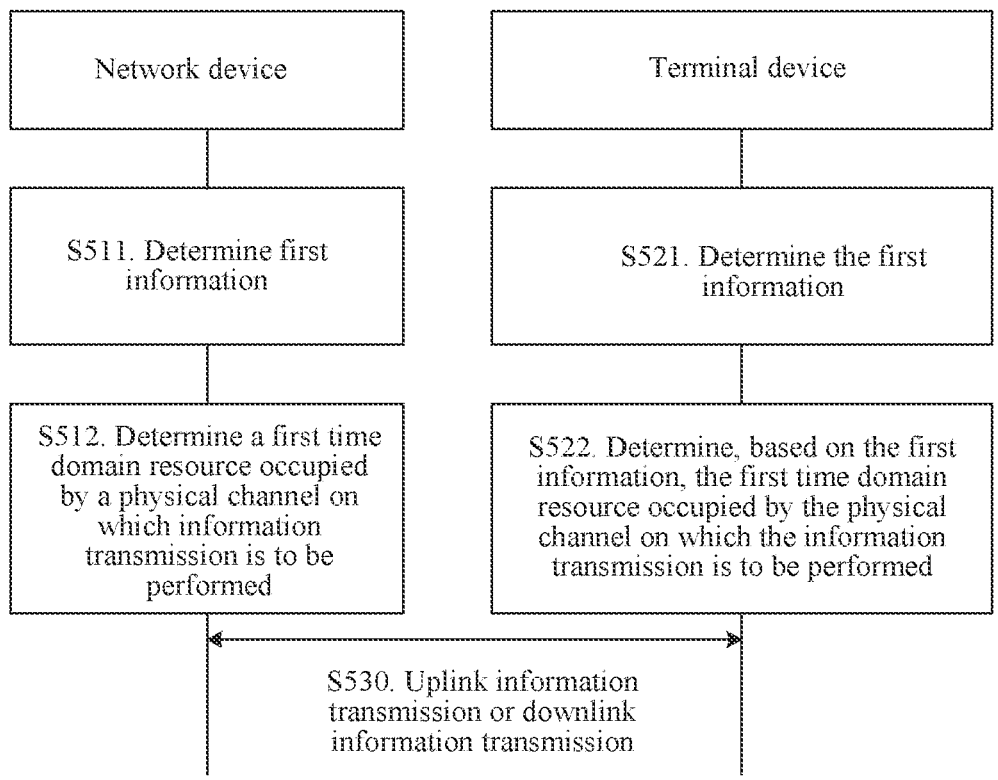
FIG. 5 is a schematic diagram of still another information transmission method according to an embodiment of this application.

The embodiments shown in FIG. 3 and FIG. 4 may be combined into a new embodiment, as shown in FIG. 5. FIG. 5 shows still another information transmission method according to this application.

S511. A network device determines first information, where the first information may include at least one of a service type, a format of downlink control information, time domain resource length set information, a detection period of the downlink control information, and a control resource set CORESET configuration period.

Specifically, the network device may obtain the service type from a core network in a service setup process. The network device may determine the format of the downlink control information based on a data scheduling result. The network device may determine the time domain resource length set information based on information predefined or preconfigured in a protocol. The network device may determine the detection period of the downlink control information based on information predefined or preconfigured in a protocol. The network device may determine the CORESET configuration period based on information predefined or preconfigured in a protocol.

S512. The network device determines a first time domain resource occupied by a physical channel on which information transmission is to be performed with a terminal device.

When the first information corresponds to the first time domain resource, the network device may directly determine, based on the first information, the first time domain resource occupied by the physical channel on which the information transmission is to be performed.

When the first information corresponds to a time domain resource set, the network device may first determine, based on the first information, the time domain resource set corresponding to the first information, then select the proper first time domain resource from the set for the information transmission, add index information of the first time domain resource in the time domain resource set to second information, and send the second information to the terminal device.

S521. The terminal device determines the first information.

Specifically, a method for determining the first information by the terminal device is related to specific content included in the first information. When the first information includes at least one of the service type, the time domain resource length set information, the detection period of the downlink control information, and the CORESET configuration period, the terminal device may obtain the first information by receiving signaling from the network device. When the first information includes the format of the downlink control information, the terminal device may receive and detect the downlink control information, to determine the format of the downlink control information. The terminal device may alternatively determine the time domain resource length set information based on the information predefined in the protocol. The terminal device may alternatively determine the detection period of the downlink control information based on the information predefined in the protocol. The terminal device may alternatively determine the CORESET configuration period based on the information predefined in the protocol.

S522. The terminal device determines, based on the first information, the first time domain resource occupied by the physical channel on which the information transmission is to be performed with the network device. For a specific determining process and method, refer to the related descriptions in S320.

S530. The terminal device and the network device perform information transmission on the first time domain resource and through the physical channel. For a specific information transmission method, refer to the related descriptions in S330. Details are not described herein again.

Implementation details of the foregoing three embodiments are further described below.

There may be two definition methods for the time domain resource set corresponding to the first information, and the two definition methods are separately described below.

Method 1: Application scenarios are not distinguished, and a general time domain resource set is defined. The set may be presented in a form of a table or may be presented in a form of a multi-dimensional array. A slot including 14 symbols is used as an example. A time domain resource set for performing data scheduling in the slot may be shown in Table 1. The time domain resource set may be provided from two dimensions: a location of a start symbol and a location of an end symbol. Both the location of the start symbol and the location of the end symbol are numbers in the slot. The location of the end symbol in the table may alternatively be replaced with duration, as shown in Table 2. A unit of the duration in Table 2 is a time domain symbol.

TABLE 1

| Index value | Location of a start symbol | Location of an end symbol |
| --- | --- | --- |
| 0 | 0 | 13 |
| 1 | 0 | 12 |
| 2 | 0 | 11 |
| ... | ... | ... |
| 14 | 1 | 13 |
| 15 | 1 | 12 |
| ... | ... | ... |
| 102 | 12 | 13 |
| 103 | 12 | 12 |
| 104 | 13 | 13 |

TABLE 2

| Index value | Location of a start symbol | Duration (symbol) |
| --- | --- | --- |
| 0 | 0 | 14 |
| 1 | 0 | 13 |
| 2 | 0 | 12 |
| ... | ... | ... |
| 14 | 1 | 13 |
| 15 | 1 | 12 |
| ... | ... | ... |
| 102 | 12 | 2 |
| 103 | 12 | 1 |
| 104 | 13 | 1 |

When multi-slot scheduling is supported, a column indicating a quantity of slots may be added to the time domain resource sets shown in Table 1 and Table 2. Using Table 1 as an example, after the column indicating the quantity of slots is added, a table is shown in Table 3. The column indicating the quantity of slots is used to indicate a quantity of slots occupied by the physical channel on which the information transmission is to be performed. The location of the start symbol and the location of the end symbol in Table 3 may be used to indicate a location of a start symbol and a location of an end symbol for the information transmission in each occupied slot. In other words, locations of start symbols for the information transmission in the occupied slots are the same and locations of end symbols for the information transmission in the occupied slots are the same. In Table 3, the location of the start symbol may alternatively be used to indicate a location of a start symbol in the first slot occupied by the physical channel, and the location of the end symbol is used to indicate a location of an end symbol in the last slot occupied by the physical channel. In a default case, a start slot for the multi-slot scheduling is the same as a slot in which a PDCCH is located. When it is supported that a start slot occupied by the physical channel on which the information transmission is to be performed is different from the slot in which the PDCCH is located, a column may be added to Table 3 to indicate a number of the start slot occupied by the physical channel. When the multi-slot scheduling is not supported but it is supported that the start slot occupied by the physical channel is different from the slot in which the PDCCH is located, the quantity of slots in Table 3 may be replaced with the number of the start slot.

TABLE 3

| Index value | Location of a start symbol | Location of an end symbol | Quantity of slots |
| --- | --- | --- | --- |
| 0 | 0 | 13 | 1 |
| 1 | 0 | 12 | 1 |
| 2 | 0 | 11 | 1 |
| ... | ... | ... | 1 |
| 14 | 1 | 13 | 1 |
| 15 | 1 | 12 | 1 |
| ... | ... | ... | 1 |
| 102 | 12 | 13 | 1 |
| 103 | 12 | 12 | 1 |
| 104 | 13 | 13 | 1 |
| ... | ... | ... | 2 |
| ... | ... | ... | 3 |

Further, a set of index values is defined in the general time domain resource set shown in Table 1 to Table 3 based on different application scenarios. In other words, a set of index values is defined based on different first information. A specific definition manner may be one of the following several types:

The set of the index values is defined based on the format of the DCI.

The set of the index values is defined based on the service type.

The set of the index values is defined based on a time domain resource length set.

The set of the index values is defined based on the detection period of the downlink control information.

The set of the index values is defined based on the CORESET configuration period.

The set of the index values is defined based on values of a combination of at least two of the service type, the format of the downlink control information, the time domain resource length set information, the detection period of the downlink control information, and the control resource set CORESET configuration period.

The time domain resource set is defined by defining the set of the index values above. It may be understood that the time domain resource set may alternatively directly include specific time domain resource information, for example, values of the start symbol, the end symbol, and/or the duration, instead of index value information.

For different first information, different time domain resource sets may be defined, or a same time domain resource set may be defined. Specifically, the time domain resource set may be predefined in a system or a protocol. Alternatively, after determining the time domain resource set, the network device may notify the terminal device of the first information by using signaling, and the terminal device determines, based on the first information, the time domain resource set corresponding to the first information.

An example in which formats of the DCI are different is used below for description. An index value configured for a DCI format 1 is from 0 to 19, and an index value configured for a DCI format 2 is from 20 to 49. The DCI format 1 herein may be a compact DCI format, and the DCI format 2 may be a non-compact DCI format. For another example, when the format of the DCI is a compact DCI format, one index value may be configured or one piece of specific time domain resource information may be configured. For another example, when the format of the DCI is a fallback DCI format, one index value is configured or one piece of specific time domain resource information is configured. When the format of the DCI is a DCI format other than the fallback DCI format or the compact DCI format, or when the format of the DCI is a DCI format other than the fallback DCI format, or when the format of the DCI is a DCI format other than the compact DCI format, a plurality of index values or a plurality of pieces of specific time domain resource information are configured. "A plurality of" herein refers to more than one.

An example in which services are different is used for description below. A possible method for determining the time domain resource set is: For a service having a relatively high latency requirement, a start symbol of a time domain resource used for information transmission needs to be relatively forward, to be specific, more close to a start location of the PDCCH or the slot. For a service whose latency requirement is not very high, a start symbol of a time domain resource used for information transmission may be relatively backward. The time domain resource set determined by using the method can be reduced without affecting a degree of freedom of scheduling, to reduce a quantity of bits used to indicate the time domain resource in the DCI. For example, for the service having the relatively high latency requirement, such as, a URLLC service, assuming that the start symbol is relative to the start location of the PDCCH, a time domain resource set that is configured for the service and that is indicated by index values of time domain resources may include {12 (a corresponding start symbol 0, a corresponding end symbol 0), 13 (a corresponding start symbol 0, a corresponding end symbol 1), 27 (a corresponding start symbol 1, a corresponding end symbol 1)}. For another example, for the service whose latency requirement is not very high, such as, an eMBB service, assuming that the start symbol is relative to the start location of the PDCCH, a time domain resource set that is configured for the service and that is indicated by index values of time domain resources may include {X1 (a corresponding start symbol 5, a corresponding end symbol 13), X2 (a corresponding start symbol 6, a corresponding end symbol 13), X3 (a corresponding start symbol 5, a corresponding end symbol 12), X4 (a corresponding start symbol 6, a corresponding end symbol 12), . . . , X10 (a corresponding start symbol 7, a corresponding end symbol 12)}.

An example in which CORESET configuration periods are different is used for description below. A possible method for determining the time domain resource set is described as follows. The time domain resource used for the information transmission is limited to one CORESET configuration period, in other words, a time domain resource for one information transmission does not cross two neighboring CORESET configuration periods. The time domain resource set determined by using the method can be reduced without affecting a degree of freedom of scheduling, to reduce a quantity of bits used to indicate the time domain resource in the DCI. For example, the CORESET configuration period is 2. Assuming that the start symbol is relative to a start location of the PDCCH, a configured time domain resource set that is indicated by index values of time domain resources may include {12 (a corresponding start symbol 0, a corresponding end symbol 0), 13 (a corresponding start symbol 0, a corresponding end symbol 1), 27 (a corresponding start symbol 1, a corresponding end symbol 1)}. For another example, the CORESET configuration period is 4. Assuming that the start symbol is relative to a start location of the PDCCH, a configured time domain resource set that is indicated by index values of time domain resources may include {X1 (a corresponding start symbol 0, a corresponding end symbol 0), X2 (a corresponding start symbol 0, a corresponding end symbol 1), X3 (a corresponding start symbol 0, a corresponding end symbol 2), X4 (a corresponding start symbol 0, a corresponding end symbol 3), . . . , X10 (a corresponding start symbol 3, a corresponding end symbol 3)}.

An example in which both formats of the DCI and detection periods of the downlink control information are different is used for description below. A possible method for determining the time domain resource set is described as follows. The time domain resource used for the information transmission is limited to one detection period of the downlink control information, in other words, a time domain resource for one information transmission does not cross two neighboring detection periods of the downlink control information. The time domain resource set determined by using the method can be reduced without affecting a degree of freedom of scheduling, to reduce a quantity of bits used to indicate the time domain resource in the DCI. For example, the detection period of the downlink control information is 2, and the format of the DCI is a format 1. Assuming that the start symbol is relative to a start location of the PDCCH, a time domain resource set that is configured for the DCI format 1 and that is indicated by index values of time domain resources may include {12 (a corresponding start symbol 0, a corresponding end symbol 0), 13 (a corresponding start symbol 0, a corresponding end symbol 1), 27 (a corresponding start symbol 1, a corresponding end symbol 1)}. For another example, the detection period of the downlink control information is 4, and the format of the DCI is a format 1. Assuming that the start symbol is relative to a start location of the PDCCH, a time domain resource set that is configured for the DCI format 1 and that is indicated by index values of time domain resources may include {X1 (a corresponding start symbol 0, a corresponding end symbol 0), X2 (a corresponding start symbol 0, a corresponding end symbol 1), X3 (a corresponding start symbol 0, a corresponding end symbol 2), X4 (a corresponding start symbol 0, a corresponding end symbol 3), . . . , X10 (a corresponding start symbol 3, a corresponding end symbol 3)}.

An example in which both formats of the DCI and time domain resource length sets are different is used for description below. A possible method for determining the time domain resource set is described as follows. Duration of a time domain resource in the time domain resource set is a subset or a universal set of the time domain resource length set. The time domain resource set determined by using the method can be reduced without affecting a degree of freedom of scheduling, to reduce a quantity of bits used to indicate the time domain resource in the DCI. For example, the time domain resource length set is {2, 4}, and the format of the DCI is a DCI format 1. Assuming that the start symbol is relative to a start location of the PDCCH, a time domain resource set that is configured for the DCI format 1 and that is indicated by index values of time domain resources may include {Y1 (a corresponding start symbol 0, a corresponding end symbol 1), Y2 (a corresponding start symbol 0, a corresponding end symbol 2), Y3 (a corresponding start symbol 1, a corresponding end symbol 3), Y4 (a corresponding start symbol 1, a corresponding end symbol 4)}. For another example, the time domain resource length set is 7, and the format of the DCI is a DCI format 1. Assuming that the start symbol is relative to a start location of the PDCCH, a time domain resource set that is configured for the DCI format 1 and that is indicated by index values of time domain resources may include {Y1 (a corresponding start symbol 0, a corresponding end symbol 6), Y2 (a corresponding start symbol 1, a corresponding end symbol 7)}.

It may be understood that, for a scenario in which the first information is another combination, a method for determining the time domain resource set based on the first information may be directly obtained with reference to the foregoing embodiment, and details are not described herein again.

Method 2: Application scenarios are distinguished, and time domain resource sets are defined. In other words, time domain resource sets are defined based on different first information. A specific definition manner may be one of the following several types:

The time domain resource set is defined based on the format of the DCI.

The time domain resource set is defined based on the service type.

The time domain resource set is defined based on a time domain resource length set.

The time domain resource set is defined based on the detection period of the downlink control information.

The time domain resource set is defined based on the CORESET configuration period.

The time domain resource set is defined based on values of a combination of at least two of the service type, the format of the downlink control information, the time domain resource length set information, the detection period of the downlink control information, and the control resource set CORESET configuration period.

A presentation form of the foregoing time domain resource set may be a table or an array. An example in which formats of the DCI are different is used for description below. A time domain resource set configured for a DCI format 1 is shown in Table 4, and a time domain resource set configured for a DCI format 2 is shown in Table 5. The DCI format 1 herein may be a compact DCI format, and the DCI format 2 may be a non-compact DCI format. For another example, when the format of the DCI is a compact DCI format, only one piece of specific time domain resource information may be configured, in other words, there is only one possible case for the time domain resource. For another example, when the format of the DCI is a fallback DCI format, only one piece of specific time domain resource information may also be configured. When the format of the DCI is a DCI format other than the fallback DCI format or the compact DCI format, or when the format of the DCI is a DCI format other than the fallback DCI format, or when the format of the DCI is a DCI format other than the compact DCI format, a plurality of pieces of specific time domain resource information are configured. "A plurality of" herein refers to more than one.

TABLE 4

| Index value | Location of a start symbol | Duration (symbol) |
| --- | --- | --- |
| 0 | 1 | 1 |
| 1 | 1 | 2 |
| 2 | 2 | 1 |
| 3 | 2 | 2 |

TABLE 5

| Index value | Location of a start symbol | Duration (symbol) |
| --- | --- | --- |
| 0 | 1 | 14 |
| 1 | 2 | 13 |
| 2 | 3 | 12 |
| 3 | 4 | 11 |

An example in which services are different is used for description below. A possible method for determining the time domain resource set is described as follows. For a service having a relatively high latency requirement, a start symbol 0f a time domain resource used for information transmission needs to be relatively forward, to be specific, more close to a start location of the PDCCH or the slot. For a service whose latency requirement is not very high, a start symbol 0f a time domain resource used for information transmission may be relatively backward. The time domain resource set determined by using the method can be reduced without affecting a degree of freedom of scheduling, to reduce a quantity of bits used to indicate the time domain resource in the DCI. For example, for the service having the relatively high latency requirement, such as, a URLLC service, assuming that the start symbol is relative to the start location of the PDCCH, a time domain resource set that is configured for the service and that is indicated by index values of time domain resources may include {(a start symbol 0, an end symbol 0), (a start symbol 0, an end symbol 1), (a start symbol 1, an end symbol 1)}. For another example, for the service whose latency requirement is not very high, such as, an eMBB service, assuming that the start symbol is relative to the start location of the PDCCH, a time domain resource set that is configured for the service and that is indicated by index values of time domain resources may include {X1 (a start symbol 5, an end symbol 13), X2 (a start symbol 6, an end symbol 13), X3 (a start symbol 5, an end symbol 12), X4 (a start symbol 6, an end symbol 12), . . . , X10 (a start symbol 7, an end symbol 12)}.

An example in which CORESET configuration periods are different is used for description below. A possible method for determining the time domain resource set is: The time domain resource used for the information transmission is limited to one CORESET configuration period, in other words, a time domain resource for one information transmission does not cross two neighboring CORESET configuration periods. The time domain resource set determined by using the method can be reduced without affecting a degree of freedom of scheduling, to reduce a quantity of bits used to indicate the time domain resource in the DCI. For example, the CORESET configuration period is 2. Assuming that the start symbol is relative to a start location of the PDCCH, a configured time domain resource set that is indicated by index values of time domain resources may include {(a start symbol 0, an end symbol 0), (a start symbol 0, an end symbol 1), (a start symbol 1, an end symbol 1)}. For another example, the CORESET configuration period is 4. Assuming that the start symbol is relative to a start location of the PDCCH, a configured time domain resource set that is indicated by index values of time domain resources may include {(a start symbol 0, an end symbol 0), (a start symbol 0, an end symbol 1), (a start symbol 0, an end symbol 2), (a start symbol 0, an end symbol 3), . . . , (a start symbol 3, an end symbol 3)}.

An example in which both formats of the DCI and detection periods of the downlink control information are different is used for description below. A possible method for determining the time domain resource set is described as follows. The time domain resource used for the information transmission is limited to one detection period of the downlink control information, in other words, a time domain resource for one information transmission does not cross two neighboring detection periods of the downlink control information. The time domain resource set determined by using the method can be reduced without affecting a degree of freedom of scheduling, to reduce a quantity of bits used to indicate the time domain resource in the DCI. For example, the detection period of the downlink control information is 2, and the format of the DCI is a format 1. Assuming that the start symbol is relative to a start location of the PDCCH, a time domain resource set configured for the DCI format 1 may include {(a start symbol 0, an end symbol 0), (a start symbol 0, an end symbol 1), (a start symbol 1, an end symbol 1)}. For another example, the detection period of the downlink control information is 4, and the format of the DCI is a format 1. Assuming that the start symbol is relative to a start location of the PDCCH, a time domain resource set configured for the DCI format 1 may include {(a start symbol 0, an end symbol 0), (a start symbol 0, an end symbol 1), (a start symbol 0, an end symbol 2), (a start symbol 0, an end symbol 3), . . . , (a start symbol 3, an end symbol 3)}.

An example in which both formats of the DCI and time domain resource length sets are different is used for description below. A possible method for determining the time domain resource set is: Duration of a time domain resource in the time domain resource set is a subset or a universal set of the time domain resource length set. The time domain resource set determined by using the method can be reduced without affecting a degree of freedom of scheduling, to reduce a quantity of bits used to indicate the time domain resource in the DCI. For example, the time domain resource length set is {2, 4}, and the format of the DCI is a DCI format 1. Assuming that the start symbol is relative to a start location of the PDCCH, a time domain resource set configured for the DCI format 1 may include {(a start symbol 0, an end symbol 1), (a start symbol 0, an end symbol 2), (a start symbol 1, an end symbol 3), (a start symbol 1, an end symbol 4)}. For another example, the time domain resource length set is 7, and the format of the DCI is a DCI format 1. Assuming that the start symbol is relative to a start location of the PDCCH, a time domain resource set configured for the DCI format 1 may include {(a start symbol 0, an end symbol 6), (a start symbol 1, an end symbol 7)}.

It may be understood that, for a scenario in which the first information is another combination, a method for determining the time domain resource set based on the first information may be directly obtained with reference to the foregoing embodiment, and details are not described herein again.

It may be understood that, a column indicating a quantity of slots, or a column indicating a start slot number, or both a column indicating a quantity of slots and a column indicating a start slot number may further be added to the time domain resource sets defined in Table 4 and Table 5. The duration in Table 4 and Table 5 may alternatively be replaced with a location of an end symbol. When the location of the start symbol is preset in a system or a protocol, the column indicating the location of the start symbol may be omitted in the foregoing tables of the time domain resource sets.

It should be noted that, numbers of the index value in Table 1 to Table 5 may start from 0 or start from 1. The numbers of the index values may be in ascending order or descending order. A table defined in a protocol may be a subset of the foregoing tables or a simple extension of the foregoing tables. Numbers of the location of the start symbol and the location of the end symbol in the tables may start from 0 or start from 1. Sequences of columns in the table may be exchangeable.

An example in which the first information is the format of the DCI is used, to further describe a method for determining, by the terminal device based on the first information, the first time domain resource occupied by the physical channel on which the information transmission is to be performed in step S522. The terminal device may directly determine the first time domain resource based on the format of the DCI. For example, when the format of the DCI is a DCI format 1, a location number of the start symbol 0f the first time domain resource is 1, and a location number of the end symbol is 2. When the format of the DCI is a DCI format 2, a location number of the start symbol 0f the first time domain resource is 1, and a location number of the end symbol is 14. Alternatively, the terminal device may first determine the time domain resource set based on the format of the DCI. For example, when the DCI format is a compact DCI format, it is determined that the time domain resource set is the time domain resource set shown in Table 4. Further, the terminal device further determines the first time domain resource based on the second information carried in the DCI. For example, when the second information is 2, the location of the start symbol 0f the determined first time domain resource is 2, and the duration is one symbol. Whether a location of a symbol is a relative location relative to the PDCCH or is an absolute location in the slot may be predefined in the system or the protocol, or may be determined by the network device and then notified to the terminal device by using signaling.

According to the foregoing method, the network device and the terminal device may flexibly select the time domain resource for information transmission based on a requirement of a specific scenario, and a payload size of the DCI can be effectively reduced, to improve transmission reliability of the control channel, and further to improve reliability of data transmission.

The information transmission methods provided in the embodiments of this application are respectively described from the perspective of the network device, the terminal device, and interaction between the network device and the terminal device in the foregoing embodiments. It may be understood that to implement the foregoing functions, the devices include hardware structures and/or software modules corresponding to the functions. A person skilled in the art should easily be aware that, the examples of units and method steps described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
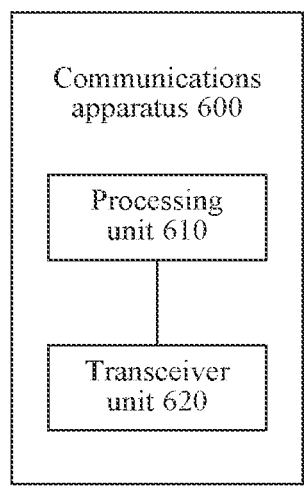
FIG. 6 is a schematic structural diagram of an apparatus according to an embodiment of this application.
Figure 7:
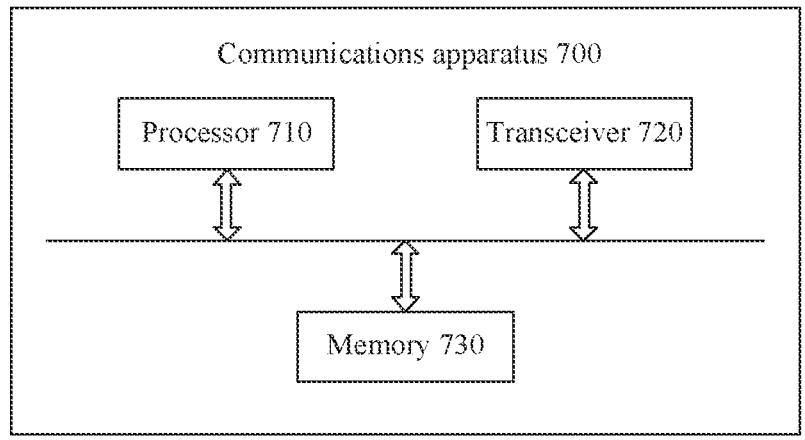
FIG. 7 is a schematic diagram of another apparatus according to an embodiment of this application.

FIG. 6 and FIG. 7 are schematic structural diagrams of two possible communications apparatuses according to an embodiment of this application. The communications apparatuses implement functions of the network device in the method embodiments of FIG. 3, FIG. 4, and FIG. 5, and therefore, can also implement beneficial effects of the foregoing method embodiments. In this embodiment of this application, the communications apparatuses may be the radio access network device 120 shown in FIG. 1, or may be a chip in the radio access network device.

As shown in FIG. 6, a communications apparatus 600 includes a processing unit 610 and a transceiver unit 620.

Corresponding to the method embodiment shown in FIG. 3, the following apparatus embodiment is provided.

The transceiver unit 620 is configured to send first information, where the first information includes at least one of a service type, time domain resource length set information, a detection period of downlink control information, and a control resource set CORESET configuration period, the first information corresponds to a first time domain resource or a time domain resource set, the time domain resource set includes at least one first time domain resource, and the first time domain resource is a time domain resource occupied by a physical channel on which information transmission is to be performed.

The transceiver unit 620 is further configured to perform information transmission on the first time domain resource and through the physical channel.

The processing unit 610 is configured to: encode and modulate to-be-sent information, and demodulate and decode received information.

Optionally, the transceiver unit 620 is specifically configured to send the first information by using radio resource control RRC signaling.

Optionally, the transceiver unit 620 is further configured to send second information, where the second information is carried in the downlink control information, and the second information is used to indicate an index of the first time domain resource in the time domain resource set.

Corresponding to the method embodiment shown in FIG. 4, the following apparatus embodiment is provided.

The transceiver unit 620 is configured to send downlink control information, where a format of the downlink control information corresponds to a first time domain resource or a time domain resource set, the time domain resource set includes at least one first time domain resource, and the first time domain resource is a time domain resource occupied by a physical channel on which information transmission is to be performed.

The transceiver unit 620 is further configured to perform information transmission on the first time domain resource and through the physical channel.

The processing unit 610 is configured to: encode and modulate to-be-sent information, and demodulate and decode received information.

Optionally, the transceiver unit 620 is further configured to send second information, where the second information is carried in the downlink control information, and the second information is used to indicate an index of the first time domain resource in the time domain resource set.

Corresponding to the method embodiment shown in FIG. 5, the following apparatus embodiment is provided.

The processing unit 610 is configured to determine first information, where the first information includes at least one of a service type, a format of downlink control information, time domain resource length set information, a detection period of the downlink control information, and a control resource set CORESET configuration period.

The processing unit 610 is further configured to determine a first time domain resource occupied by a physical channel on which information transmission is to be performed with a terminal device.

The transceiver unit 620 is configured to perform information transmission on the first time domain resource and through the physical channel.

When the first information includes at least one of the service type, the time domain resource length set information, the detection period of the downlink control information, and the CORESET configuration period, the transceiver unit 620 is further configured to send the first information by using radio resource control RRC signaling.

Optionally, the transceiver unit 620 may further be configured to send second information, where the second information is carried in the downlink control information, the second information is used to indicate an index of the first time domain resource in a time domain resource set, the time domain resource set includes at least one first time domain resource, and the time domain resource set corresponds to the first information.

As shown in FIG. 7, a communications apparatus 700 includes a processor 710 and a transceiver 720, and optionally, may further include a memory 730. The memory 730 may be configured to store code executed by the processor 710. Components of the communications apparatus 700 communicate with each other by using an internal connection path, for example, transmit a control and/or data signal by using a bus. The processor 710 is configured to perform a function of the processing unit 610, and the transceiver 720 is configured to perform a function of the transceiver unit 620.

Other functional descriptions of the processing unit 610, the processor 710, the transceiver unit 620, and the transceiver 720 may be directly obtained with reference to the method embodiments shown in FIG. 3, FIG. 4, and FIG. 5. An information receiving and sending function in the foregoing method embodiments is performed by the transceiver unit 620 or the transceiver 720, and other data processing functions are all performed by the processing unit 610 or the processor 710. Details are not described herein again.

Figure 8:
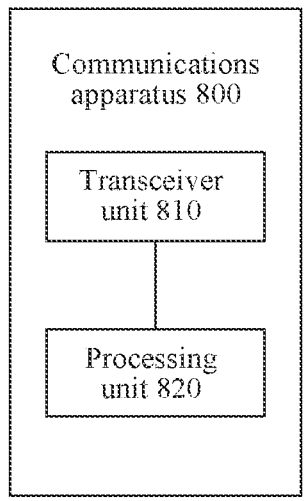
FIG. 8 is a schematic diagram of another apparatus according to an embodiment of this application.
Figure 9:
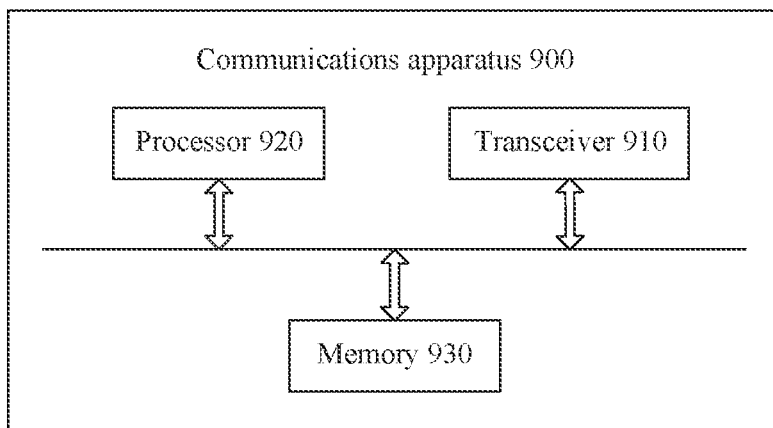
FIG. 9 is a schematic diagram of another apparatus according to an embodiment of this application.

FIG. 8 and FIG. 9 are schematic structural diagrams of other two possible communications apparatuses according to an embodiment of this application. The communications apparatuses implement functions of the terminal device in the method embodiments shown in FIG. 3, FIG. 4, and FIG. 5, and therefore, can also implement beneficial effects of the foregoing method embodiments. In this embodiment of this application, the communications apparatuses may be the terminal device 130 or the terminal device 140 shown in FIG. 1, or may be a chip in the terminal device.

As shown in FIG. 8, a communications apparatus 800 includes a transceiver unit 810 and a processing unit 820.

Corresponding to the method embodiment shown in FIG. 3, the following apparatus embodiment is provided.

The transceiver unit 810 is configured to receive first information, where the first information includes at least one of a service type, time domain resource length set information, a detection period of downlink control information, and a control resource set CORESET configuration period, the first information corresponds to a first time domain resource or a time domain resource set, the time domain resource set includes at least one first time domain resource, and the first time domain resource is a time domain resource occupied by a physical channel on which information transmission is to be performed between a terminal device and a network device.

The processing unit 820 is configured to determine, based on the first information, the first time domain resource occupied by the physical channel on which the information transmission is to be performed.

The transceiver unit 810 is further configured to perform information transmission on the first time domain resource and through the physical channel.

Optionally, the transceiver unit 810 is specifically configured to receive the first information by using radio resource control RRC signaling.

Optionally, the transceiver unit 810 may further be configured to receive second information, where the second information is carried in the downlink control information, and the second information is used to indicate an index of the first time domain resource in the time domain resource set.

Corresponding to the method embodiment shown in FIG. 4, the following apparatus embodiment is provided.

The transceiver unit 810 is configured to receive downlink control information.

The processing unit 820 is configured to determine a format of the downlink control information. Specifically, the processing unit 820 detects the downlink control information on a configured CORESET to determine the format of the downlink control information.

The processing unit 820 is further configured to determine, based on the format of the downlink control information, a first time domain resource occupied by a physical channel on which information transmission is to be performed.

The transceiver unit 810 is further configured to perform information transmission on the first time domain resource and through the physical channel.

Optionally, the transceiver unit 810 may further be configured to receive second information, where the second information is carried in the downlink control information, the second information is used to indicate an index of the first time domain resource in a time domain resource set, the time domain resource set includes at least one first time domain resource, and the time domain resource set corresponds to the format of the downlink control information.

Corresponding to the method embodiment shown in FIG. 5, the following apparatus embodiment is provided.

The processing unit 820 is configured to determine first information, where the first information includes at least one of a service type, a format of downlink control information, time domain resource length set information, a detection period of the downlink control information, and a control resource set CORESET configuration period.

The processing unit 820 is further configured to determine, based on the first information, a first time domain resource occupied by a physical channel on which information transmission is to be performed.

The transceiver unit 810 is configured to perform information transmission on the first time domain resource and through the physical channel.

When the first information includes at least one of the service type, the time domain resource length set information, the detection period of the downlink control information, and the CORESET configuration period, the transceiver unit 810 is further configured to receive the first information by using radio resource control RRC signaling.

When the first information includes the format of the downlink control information, the transceiver unit 810 is further configured to receive the downlink control information, and the processing unit 820 is further configured to determine the format of the downlink control information.

Optionally, the transceiver unit 810 is further configured to receive second information, where the second information is carried in the downlink control information, the second information is used to indicate an index of the first time domain resource in a time domain resource set, the time domain resource set includes at least one first time domain resource, and the time domain resource set corresponds to the first information.

As shown in FIG. 9, a communications apparatus 900 includes a processor 920 and a transceiver 910, and optionally, may further include a memory 930. The memory 930 may be configured to store code executed by the processor 920. Components of the communications apparatus 900 communicate with each other by using an internal connection path, for example, transmit a control and/or data signal by using a bus. The processor 920 is configured to perform a function of the processing unit 820, and the transceiver 910 is configured to perform a function of the transceiver unit 810.

Other functional descriptions of the transceiver unit 810, the transceiver 910, the processing unit 82o, and the processor 920 may be directly obtained with reference to the method embodiments shown in FIG. 3, FIG. 4, and FIG. 5. An information receiving and sending function in the foregoing method embodiments is performed by the transceiver unit 810 or the transceiver 910, and other data processing functions are all performed by the processing unit 820 or the processor 92o. Details are not described herein again.

It may be understood that, FIG. 7 and FIG. 9 show only one design of the communications apparatus. In an actual application, the communications apparatus may include any quantity of transceivers and processors, and all communications apparatus that can implement the embodiments of this application fall within the protection scope of this application.

It may be understood that, when the embodiments of this application are applied to a chip of a network device, the chip of the network device implements a function of the network device in the foregoing method embodiments. The chip of the network device may send information to other modules (for example, a radio frequency module or an antenna) in the network device. The information is sent to a terminal device by using the other modules of the network device. The chip of the network device may also receive information from other modules in the network device, and the information is sent from the terminal device to the network device.

When the embodiments of this application are applied to a chip of a terminal device, the chip of the terminal device implements a function of the terminal device in the foregoing method embodiments. The chip of the terminal device may send information to other modules (for example, a radio frequency module or an antenna) in the terminal device. The information is sent to a network device by using the other modules of the terminal device. The chip of the terminal device may also receive information from other modules in the terminal device, and the information is sent from the network device to the terminal device.

It may be understood that, related terms in the method embodiments shown in FIG. 3 to FIG. 5 and the apparatus embodiments shown in FIG. 6 to FIG. 9 may be generally used. Related technologies may be mutually referenced and combined based on internal logical relationships thereof, to form a new method embodiment and a new apparatus embodiment.

It may be understood that the processor in the embodiments of this application may be a central processing unit (CPU), or may be another general purpose processor, a digital signal processor (DSP), an application-specific integrated circuit (ASIC), a field programmable gate array (FPGA), or another programmable logical device, a transistor logical device, a hardware component, or any combination thereof. The general purpose processor may be a microprocessor or any regular processor The method steps in the embodiments of this application may be implemented in a hardware manner or may be implemented in a manner of executing a software instruction by a processor. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a sending device or a receiving device. Certainly, the processor and the storage medium may exist as discrete assemblies in a sending device or a receiving device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "a plurality of" in this specification means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates that associated objects are in an "or" relationship. In a formula, the character "/" indicates that associated objects are in a "division" relationship.

It may be understood that various numbers in the embodiments of this application are merely used for distinguishing for ease of description, and are not used as a limitation on this application.

It may be understood that sequence numbers of the foregoing processes do not mean an execution order in the embodiments of this application. The execution order of the processes should be determined based on functions and internal logic of the processes, and should not be construed as any limitation on the implementation processes of the embodiments of this application.

The invention claimed is:

1. An apparatus comprising:
at least one processor coupled to a non-transitory memory having a computer program stored thereon, wherein the at least one processor is configured to execute instructions of the computer program, and execution of the instructions enables the apparatus to:
receive, via a control channel, downlink control information (DCI) with a cyclic redundancy code (CRC) scrambled by a first radio network temporary identifier (RNTI) of a plurality of RNTIs, a value of the first RNTI indicating a first time domain resource set, and the first time domain resource set comprising a first time domain resource, wherein the plurality of RNTIs further comprises a second RNTI whose value indicates a second time domain resource set, and the second RNTI is different from the first RNTI, and wherein the first time domain resource set is predefined in a protocol or configured by radio resource control (RRC) signaling, the second time domain resource set is predefined in the protocol or configured by radio resource control (RRC) signaling, and the DCI comprises first information corresponding to a value of an index of the first time domain resource in the first time domain resource set, different time domain resources in the first time domain resource set corresponding to different indexes;
determine the first time domain resource set based on the value of the first RNTI;
determine the first time domain resource based on the first time domain resource set and the first information; and
perform, via a data channel, information transmission on the first time domain resource; and
wherein the first time domain resource set and the second time domain resource set are predefined in a protocol, the second time domain resource set is different from the first time domain resource set.

2. The apparatus according to claim 1, wherein a location of a start symbol of the first time domain resource is an absolute location in a slot or a location in the slot that is relative to a physical downlink control channel (PDCCH) carrying the DCI.

3. The apparatus according to claim 2, wherein whether the location of the start symbol of the first time domain resource is the absolute location in the slot or the location relative to the PDCCH is predefined in a system or the protocol, or is notified by signaling.

4. The apparatus according to claim 1, wherein the first information further indicates a quantity of slots for multi-slot scheduling.

5. A method comprising:
    receiving, via a control channel, downlink control information (DCI) with a cyclic redundancy code (CRC) scrambled by a first radio network temporary identifier (RNTI) of a plurality of RNTIs, a value of the first RNTI indicating a first time domain resource set, and the first time domain resource set comprising a first time domain resource, wherein the plurality of RNTIs further comprises a second RNTI whose value indicates a second time domain resource set, and the second RNTI is different from the first RNTI, and wherein the first time domain resource set is predefined in a protocol or configured by radio resource control (RRC) signaling, the second time domain resource set is predefined in the protocol or configured by RRC signaling, and the DCI comprises first information corresponding to a value of an index of the first time domain resource in the first time domain resource set, different time domain resources in the first time domain resource set corresponding to different indexes;
    determining the first time domain resource set based on the value of the first RNTI;
    determining the first time domain resource based on the first time domain resource set and the first information; and
    performing, via a data channel, information transmission on the first time domain resource; and
    wherein the first time domain resource set and the second time domain resource set are predefined in a protocol, the second time domain resource set is different from the first time domain resource set.

6. The method according to claim 5, wherein a location of a start symbol of the first time domain resource is an absolute location in a slot or a location in the slot that is relative to a physical downlink control channel (PDCCH) carrying the DCI.

7. The method according to claim 6, wherein whether the location of the start symbol of the first time domain resource is the absolute location in the slot or the location relative to the PDCCH is predefined in a system or the protocol, or is notified by signaling.

8. The method according to claim 5, wherein the first information further indicates a quantity of slots for multi-slot scheduling.

9. An apparatus comprising:
    at least one processor coupled to a non-transitory memory having a computer program stored thereon, wherein the at least one processor is configured to execute instructions of the computer program, execution of the instructions enables the apparatus to:
    determine a first time domain resource set based on a value of a first radio network temporary identifier (RNTI);
    send, via a control channel, downlink control information (DCI) with a cyclic redundancy code (CRC) scrambled by the first RNTI of a plurality of RNTIs, wherein the value of the first RNTI indicates the first time domain resource set, and the first time domain resource set comprises a first time domain resource, wherein the plurality of RNTIs further comprises a second RNTI whose value indicates a second time domain resource set, and the second RNTI is different from the first RNTI, and wherein the first time domain resource set is predefined in a protocol or configured by radio resource control (RRC) signaling, the second time domain resource set is predefined in the protocol or configured by radio resource control (RRC) signaling, and the DCI comprises first information corresponding to a value of an index of the first time domain resource in the first time domain resource set, different time domain resources in the first time domain resource set corresponding to different indexes; and
    performing, via a data channel, information transmission on the first time domain resource; and
    wherein the first time domain resource set and the second time domain resource set are predefined in a protocol, the second time domain resource set is different from the first time domain resource set.

10. The apparatus according to claim 9, wherein a location of a start symbol of the first time domain resource is an absolute location in a slot or a location in the slot that is relative to a physical downlink control channel (PDCCH) carrying the DCI.

11. The apparatus according to claim 10, wherein whether the location of the start symbol of the first time domain resource is the absolute location in the slot or the location relative to the PDCCH is predefined in a system or a protocol, or is notified to a terminal via signaling.

* * * * *

UNITED STATES PATENT AND TRADEMARK OFFICE
CERTIFICATE OF CORRECTION

PATENT NO. : 12,256,395 B2
APPLICATION NO. : 17/119059
DATED : March 18, 2025
INVENTOR(S) : Ma et al.

Page 1 of 1

It is certified that error appears in the above-identified patent and that said Letters Patent is hereby corrected as shown below:

In the Specification

In Column 9, Line 29, after "device" delete "no" and insert -- 110 --.

In Column 22, Line 33, delete "0f" and insert -- of --.

In Column 22, Line 37, delete "0f" and insert -- of --.

In Column 24, Line 35, delete "0f" and insert -- of --.

In Column 24, Line 38, delete "0f" and insert -- of --.

In Column 24, Line 48, delete "0f" and insert -- of --.

In Column 28, Line 37, delete "82o," and insert -- 820, --.

In Column 28, Line 44, delete "92o." and insert -- 920. --.

Signed and Sealed this
Fifteenth Day of April, 2025

Coke Morgan Stewart
*Acting Director of the United States Patent and Trademark Office*